Aug. 14, 1928.

W. L. SHARP

DAMPER

Filed Oct. 5, 1927

1,680,696

INVENTOR
William L. Sharp
By Archworth Martin,
Attorney.

Patented Aug. 14, 1928.

1,680,696

UNITED STATES PATENT OFFICE.

WILLIAM L. SHARP, OF STEUBENVILLE, OHIO, ASSIGNOR TO THE OHIO FOUNDRY & MANUFACTURING COMPANY, OF STEUBENVILLE, OHIO, A CORPORATION OF OHIO.

DAMPER.

Application filed October 5, 1927. Serial No. 224,174.

My invention relates to improvements in dampers, and more particularly to dampers of the type employed for controlling the flue outlets of fire places, but it is also capable of use in various other relations.

One object of my invention is to provide a simplified and improved form of operating mechanism for dampers.

Another object of my invention is to provide operating mechanism of such form that it will not tend to bind in use.

Still another object of my invention is to provide a damper of such form that it will be automatically maintained in various set positions, without the employment of latching mechanism or screw devices.

Figure 1:
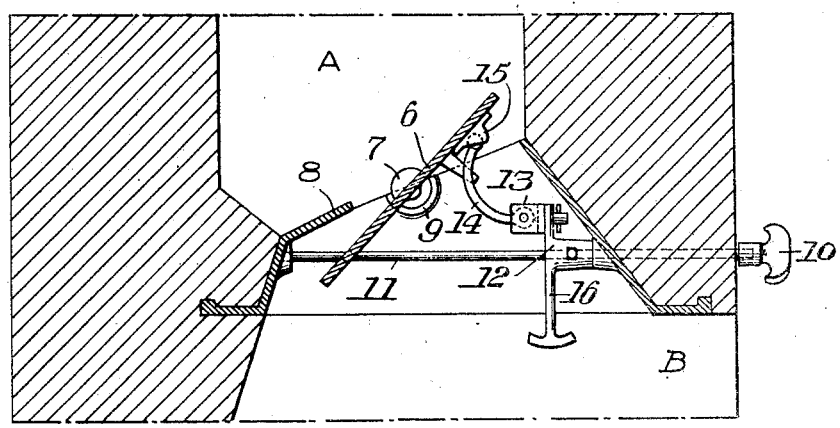
Figure 4:
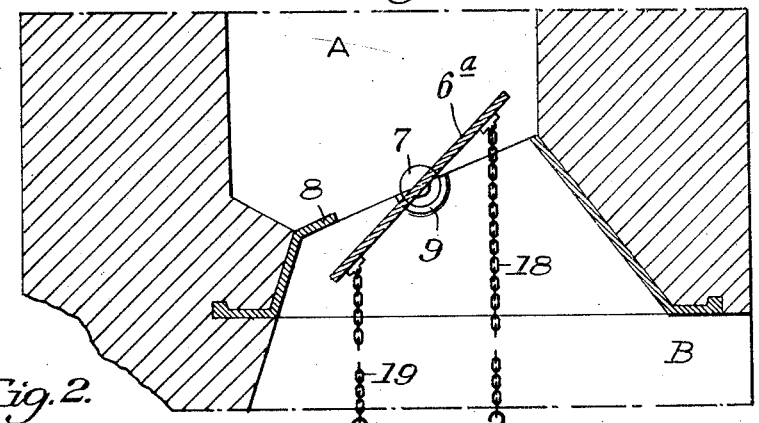
Figure 2:
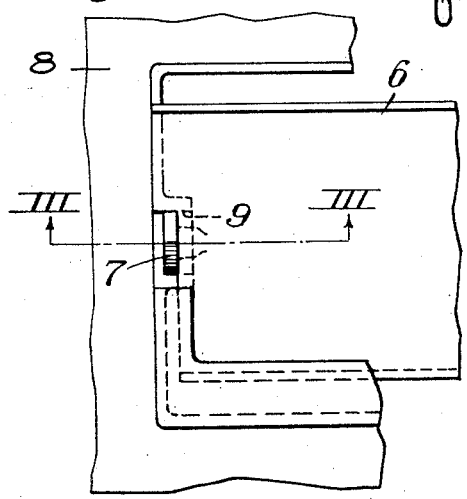
Figure 3:
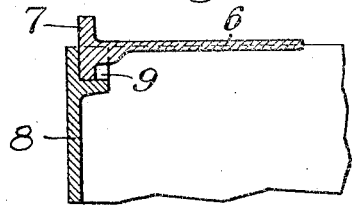

Some of the forms which my invention may take are shown in the accompanying drawing, wherein Figure 1 is a vertical sectional view, in side elevation, showing one form of mechanism for operating a damper; Fig. 2 is a plan view of a portion of the apparatus of Fig. 1; Fig. 3 is a sectional view taken on the line III—III of Fig. 2, and Fig. 4 is a view similar to Fig. 1, but showing a simplified form of damper-operating members.

Referring to the structure of Figs. 1 to 3, I show a flue A leading from a fire place B, the communicating passage between the two being controlled by a damper 6 that may be of cast metal or any other suitable material. The damper 6 has a trunnion-like extension 7 at each end that serves to support the same upon a cast iron frame or dome 8, the dome 8 being provided with a semi-circular recess 9 at each end. These recesses serve as bearings for the trunnions 7, the trunnions 7 and the seats 9 therefore being of such radius that bearing surfaces are provided of such extent that sufficient friction exists therebetween to afford resistance to tilting movement of the damper 6 in case it should not be unbalanced with respect to its axis, thereby causing the damper to remain in any set position until sufficient force is applied thereto to overcome the frictional resistance.

In the device of Fig. 1, provision is made for operating the damper 6 by a key or handle 10 upon the outer end of a shaft 11. The shaft 11 is journaled in the walls of the dome 8 and has a crank 12 fastened thereto, the outer end of the crank being perforated for the reception of a pin-like extension of a knuckle member 13. The knuckle member 13 is bifurcated at its inner end for the reception of the eye portion of a curved link 14, the said eye portion being journaled in the knuckle member 13 by means of a pin extending through the said bifurcations. The outer end of the link 14 therefore has movement about an axis parallel to the shaft 11, and also about an axis disposed transversely of said shaft. The inner end of the link 14 is of ball-like form and is supported for universal movement in a socket member 15 that is secured to the damper 6. The crank 12 is adjustably connected to the shaft 11 by a set screw, or in any other suitable manner.

A handle-like extension 16 is provided on the crank 12 to be employed for operating the damper, in lieu of the key 10.

By the arrangement above described, I not only avoid the use of latching mechanisms, but find it unnecessary to employ latches or other rigid holding means to maintain the damper in set position. Furthermore, the universal joints at the ends of the link 14 prevent binding of the movable parts during manipulation of the damper.

Referring now to Fig. 4, I show a simplified form of structure wherein the damper 6ª and the dome 8 are of substantially the form shown in the device of Figs. 1 to 3, particularly as concerns the extended bearing surfaces at the ends of the damper whereby it is held against idle tilting movement. In this form of device, the operating mechanism of Fig. 1 is dispensed with and pull chains 18 and 19 substituted therefor, the chain 18 being pulled when it is desired to close the damper, while pulling force is exerted on the chain 19 to open the damper.

The pull chains of Fig. 5 can be employed in conjunction with the operating mechanism of Fig. 1, if desired, so that the damper can be manipulated by either the pull chains or the handle, since the position of the crank 12 is such that it will not prevent movement of the damper when the chains are operated.

I claim as my invention:—

1. Damper structure comprising a tiltably mounted damper, an operating member, a link, and jointed connections between the ends of the link and the damper and said member, respectively, one of said connections being in the form of a universal joint.

2. Damper structure comprising a tiltably mounted damper, a rotatable operating shaft, a crank connected to said shaft and a curved link connection between said crank and the damper.

3. Damper structure comprising a tiltably-mounted damper, a rotatable operating shaft, a crank connected to said shaft and a curved link connection between said crank and the damper, the said link being joined to the damper and the crank by universal joints.

4. The combination with a damper, of operating mechanism therefor comprising a crank, a link, a universal joint between the crank and the link, and a ball and socket connection between the link and the damper.

5. The combination with a damper, of operating mechanism therefor, comprising a curved link, a crank, a jointed connection between the end of said link and the crank and a loose connection between said link and damper.

In testimony whereof I, the said WILLIAM L. SHARP, have hereunto set my hand.

WILLIAM L. SHARP.